United States Patent [19]

Merck

[11] 4,350,251

[45] Sep. 21, 1982

[54] APPARATUS AND METHOD FOR SELECTIVELY EJECTING MALFORMED ARTICLES

[75] Inventor: Howard W. Merck, Boraville, Ga.

[73] Assignee: Frito-Lay, Inc., Dallas, Tex.

[21] Appl. No.: 92,937

[22] Filed: Nov. 9, 1979

Related U.S. Application Data

[62] Division of Ser. No. 31,375, Apr. 19, 1979, Pat. No. 4,224,350.

[51] Int. Cl.³ .............................................. B07C 9/00
[52] U.S. Cl. .................................. 209/642; 209/654; 209/671
[58] Field of Search .............. 209/606, 616, 638, 642, 209/654, 659, 660, 663, 667, 671

[56] References Cited

U.S. PATENT DOCUMENTS

| | | |
|---|---|---|
| 1,878,315 | 9/1932 | Phelps . |
| 2,030,587 | 2/1936 | Heaslet .............................. 209/642 X |
| 2,114,263 | 4/1938 | Heaslet .............................. 209/642 X |
| 2,212,264 | 8/1940 | Downing ........................ 209/642 X |
| 2,861,685 | 11/1958 | Cordis .................................. 209/616 |
| 2,964,181 | 12/1960 | Demarest et al. . |
| 3,043,429 | 7/1962 | Osmanski . |
| 3,757,800 | 9/1973 | David et al. . |
| 4,244,475 | 1/1981 | Green ................................. 209/588 |

FOREIGN PATENT DOCUMENTS 774461  5/1957  United Kingdom .

Primary Examiner—Joseph J. Rolla
Attorney, Agent, or Firm—Bernard, Rothwell & Brown

[57] ABSTRACT

A mechanism that is suitable for incorporation in an apparatus for handling articles in a closely-spaced array to remove malformed pieces from those properly formed. The invention is especially useful in systems for treating dough pieces, particularly those used in preparing fried chip foods, to remove malformed pieces such as masa lumps. The mechanism can include a rotatable wheel having a plurality of radial blades extending from a central axis for selectively ejecting the malformed articles from a surface on which both the malformed and normally-shaped articles are interpositioned in the array and are conveyed past and below the outermost extremity of the blades. The ejected articles can be collected for recycling or disposal while the remaining acceptably-formed articles are retained for other treatment or use.

5 Claims, 3 Drawing Figures

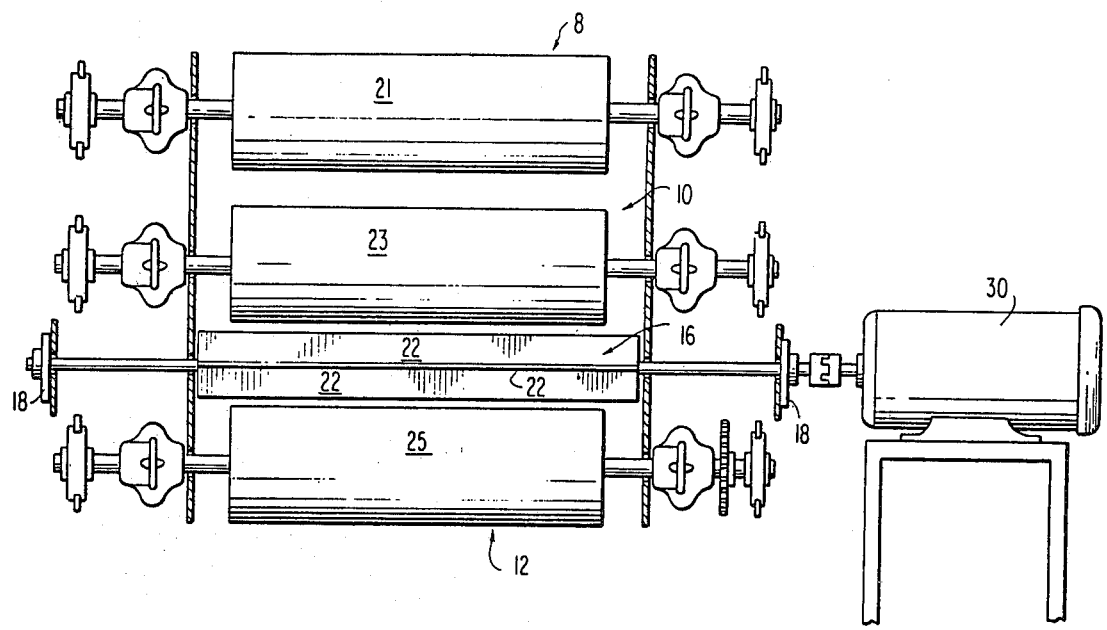
FIG.2
FIG.3
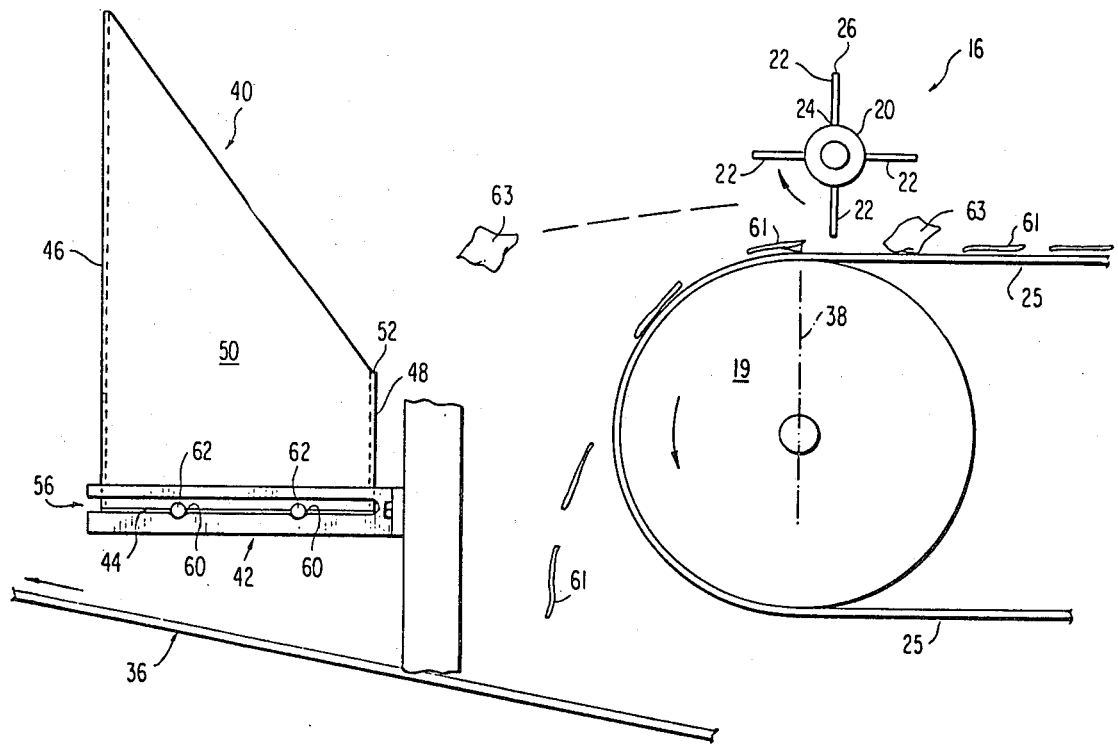

4,350,251

APPARATUS AND METHOD FOR SELECTIVELY EJECTING MALFORMED ARTICLES

This is a division of application Ser. No. 031,375, filed Apr. 19, 1979, now U.S. Pat. No. 4,224,350.

BACKGROUND AND SUMMARY OF THE INVENTION

In manufacturing fried chip foods such as fried corn chips, a dough-like material is initially formed into a thin sheet, cut into individual pieces of the desired configuration, and dried or partially baked prior to being subjected to frying. It has often been found that in the intermediate drying step, some of these dough pieces may become malformed and should be removed from the processing stream before the acceptably-formed pieces are subjected to frying. Otherwise, the malformed articles may be improperly fried or fried into rather hard ball-like objects, and find their way into the packaging process and ultimate delivery to the customer. To avoid this occurrence, inspectors may be employed to observe the pieces as they are delivered to the fryer and remove by hand those which are not properly formed. This, of course, is an expensive operation and, in addition, is not always reliable as such inspection processes are all ultimately a function of human frailty such as failure in concentration or some distraction. As a result, some of the malformed pieces may be inadvertently overlooked and not removed from the processing stream.

In the present invention, problems which have characterized this type of ejection process are overcome. For this purpose, a mechanism to remove selectively the malformed articles without materially affecting the position and movement of the remaining acceptably-formed articles has been devised and can be integrated in a system for forming the articles and their delivery to, for instance, a fryer. A feature of the invention is the ability to have the selective removal system integrated with existing systems for treating the articles, and the invention operates in a simple and efficient manner to perform the ejection operation. Another feature of the invention includes collecting the ejected, malformed pieces for disposal or recycling purposes such that they can be reintroduced into the system and eventually be converted into acceptably-formed products.

Because the human element is substantially eliminated from the system of the present invention a much more reliable and effective ejection operation is obtained. The final product is one in which quality in form is much better controlled as compared with those systems in the past where the type of ejection provided by this invention was not available. In addition, because of the cost savings resulting from the efficiency, as well as the simplicity, of the system, overall production costs can be concomitantly reduced as compared with the removal of the malformed articles by personal inspection.

In the present invention, the articles, e.g., individual dough pieces, are interpositioned in a closely-spaced array, preferably in essentially a single layer, supported on a moving surface such as a conveyor belt. The malformed articles are randomly-positioned in the array, although all or a portion of the malformed and acceptably-shaped articles can be disposed in the array in a regular pattern. The upper portion of the malformed articles extends above the supporting surface a distance greater than in the case of the acceptably-shaped articles. The ejecting device can be comprised of a rotatable member having a plurality of blades or vanes extending outwardly therefrom. The latter device is positioned above the moving surface with the outer extremities of the blades extending, when in their lowermost position, a distance above the moving surface sufficient for the acceptably-shaped articles to pass beneath the blades without being touched, at least not sufficiently to disturb, to any significant extent, their positions on the surface. The blades, however, will, in their lowermost positions, be close enough to the moving surface to make sufficient physical contact with the taller, malformed pieces and physically move or knock them out of the array of pieces, e.g., off the moving surface. The direction in which the malformed pieces are ejected is the same as the rotating blades, that is preferably the same in which the surface supplying the articles is moving. The ejected articles can be propelled by the ejecting blades into a collector or receiver and may be periodically, or even continuously, conveyed to disposal or recycling to an article-forming operation to be reformed ultimately into a desirable shape.

The articles processed according to the invention may be of various compositions and shapes; however, the malformed articles extend above their moving, supporting surface to a height greater than the acceptably-formed articles. The latter are preferably relatively thin when lying flat although they may be somewhat uneven in height. For example, suitable thicknesses may be of the order of up to about 100 mils on a flattened basis, but if the articles are not flat their overall height will, of course, be greater. Also, the articles generally have sufficient integrity not to be unduly broken or disintegrated when the malshaped articles are impacted by the ejector blades. Doughs, such as corn doughs, usually have sufficient strength and cohesiveness to remain more or less intact when struck by hard ejector blades moving at a substantial differential speed of several hundred revolutions per minute, with respect to the moving array of dough pieces, and have been found to be suitable. Should the ejected articles break unduly, their collection may be difficult, and small portions of the malformed articles may fall onto the moving surface and be mixed among the acceptably-shaped products which, of course, is not desirable.

BRIEF DESCRIPTION OF THE DRAWINGS

FIG. 2 is an end view, partly in section, of a portion of the apparatus shown in FIG. 1 taken just inside the oven and with transfer plate 7 removed.

FIG. 3 is an enlarged, elevational view of the apparatus shown in FIG. 1 incorporating the ejecting and article collecting portions of the invention.

DETAILED DESCRIPTION OF THE PREFERRED EMBODIMENT

Figure 1:
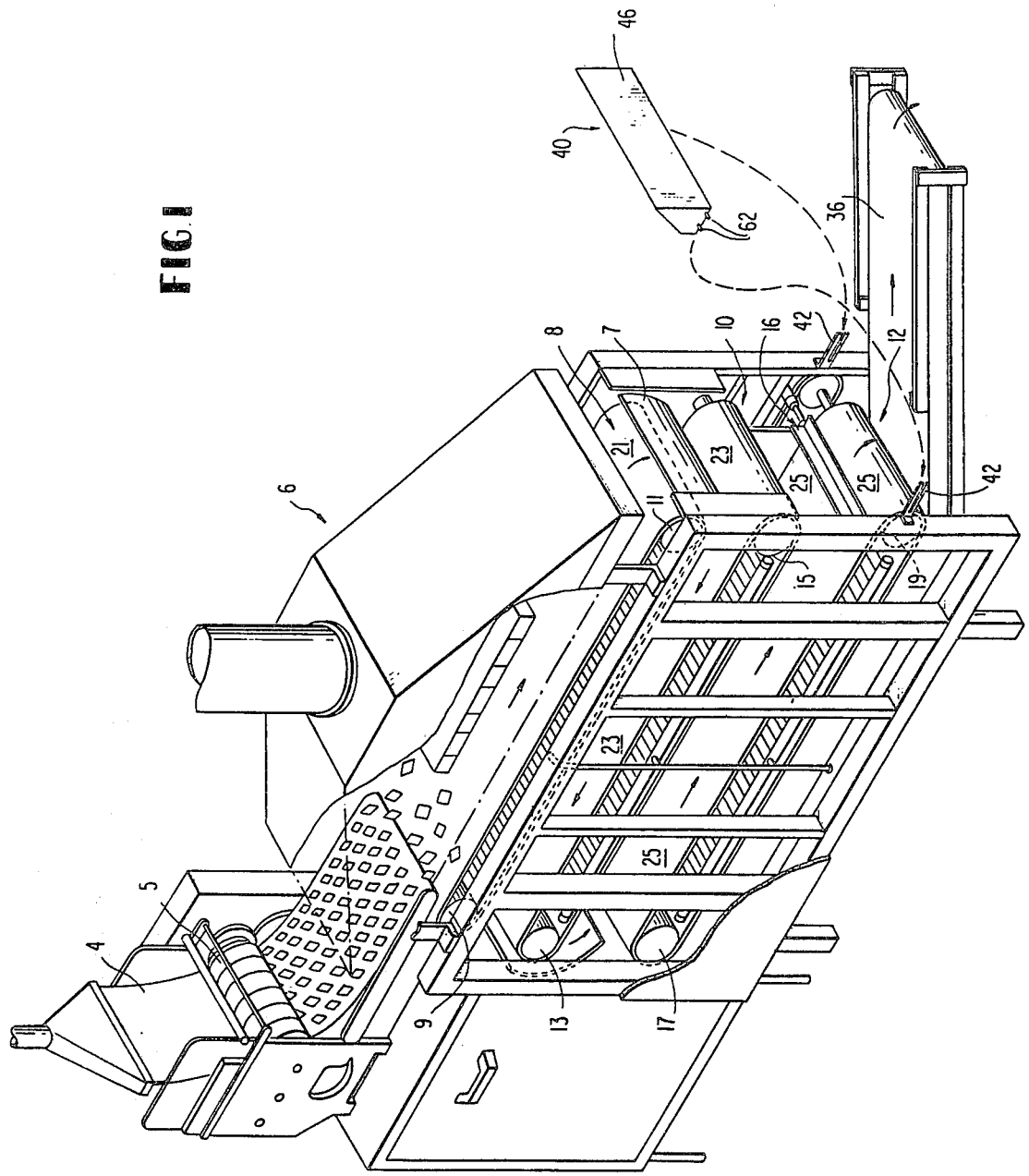
FIG. 1 is a perspective view of an apparatus for forming and drying dough-like articles according to the invention.

In FIG. 1, there is shown a perspective view of an oven typically used in processing dough pieces that ultimately will be fried into snack chip products. Initially, a dough sheet is formed and cut into individual pieces of preselected configuration which may be dried before delivery to a fryer. In this preferred embodiment, masa 4 (corn meal dough) is delivered to a sheet roller 5 which presses the dough into the desired thickness. Subsequently, the dough is cut into pieces of the desired configuration which in this case is generally diamond-shaped; however, triangular, square or other desirable shape may be cut. In this pressed and cut form the masa pieces may also be referred to as "chips" even though further treatment is required before packaging. After being cut, the chips are delivered to oven 6 where they are subjected to heat in several passes for drying the masa sufficiently before delivery to the fryer or some other processing step.

As can be seen in FIGS. 1 and 2, three conveyors are used such that all of the chips leaving the cutter are subjected to three passes in the oven. For this purpose three conveyor belt systems 8, 10, and 12, each having its own set of rollers 9 and 11, 13 and 15, and 17 and 19 and conveyor belts 21, 23, 25, respectively, are incorporated vertically one above the other for passing the chips through oven 6. In each system, conveyor belts 21, 23, 25 are flexible webs engaged by the periphery of the rollers to drive the belts in a continuous path. At the end of the first pass in conveyor system 8, there is a transfer plate 7 which the chips contact as they fall from the first conveyor belt 21 and guides them to second conveyor belt 23 in a manner which exposes the bottom side of the chip which had been resting on the top of conveyor belt 21. A similar transfer plate 7 is located at the opposite end of conveyor system 10 for delivering the chips and reversing their exposed side to the third conveyor system 12.

As can be seen from FIGS. 1 and 2 the chips as they are delivered to first belt 21 have one side facing upwardly fully exposed and the reverse side facing the conveyor belt. The above described system of conveyor belts and transfer plates permit both sides of the chips to be exposed for drying during passage through the oven. In this manner, the chips are dried sufficiently from both sides for further processing.

In preparing the chips for frying it is preferable that they be maintained in a generally flat position in an array of closely-spaced pieces that can be more or less in a single layer. It has been found that during heating in the oven the chips will tend to curl and some may become unacceptably formed. The latter can typically be referred to as "masa lumps". The masa lumps should be removed prior to delivery of the chips to the fryer as the malformed chips may not be fried properly as a result of their shape, and, further, their form may not be readily acceptable to the consumer. For removing these unduly curled chips, the ejecting mechanism of the invention is positioned adjacent conveyor roller 19 in the last conveyor system 12.

As can be seen from FIGS. 2 and 3, the ejecting mechanism includes paddle wheel 16 mounted above conveyor belt 25 of conveyor system 12 by brackets 18 on each side of the belt. Paddle wheel 16 includes a hub 20 having four equally-spaced blades 22 extending radially from the hub for engaging and driving the masa lumps off conveyor belt as the remaining chips are being discharged. Each of the blades has a substantially identical radial length and has a proximal end 24 secured to hub 20 and distal end 26 which is the outermost point of each blade 22. The blades have a transverse dimension that is substantially as wide as conveyor belt 25, and in this preferred embodiment slightly wider than the conveyor belt to ensure that those masa lumps located at any position along the width of the conveyor belt will be engaged and ejected from conveyor belt 21. Hub 20 extends in opposite directions beyond the transverse length of blades 22 where the hubs are journalled by bearings mounted on brackets 18. At least one of these extended positions is coupled to motor 30 which drives hub 20 and ultimately the paddle wheel in the same direction as the movement of conveyor belt 25. Although an electric motor is shown in the FIG. 2, any other suitable driving means can be employed; for instance, a sprocket and chain assembly secured to some other convenient drive means such as that used to drive the conveyor assemblies, or turbine driven motors may suffice. Also, the blades may be rotated in various directions above the conveyor belt, as long as the number of blades provided and their shape and speed are such that the malformed articles are selectively ejected from the mass of acceptably-shaped articles being processed.

Whatever driving mode is used, it can be made adjustable relative to conveyor belt 25 in vertical and horizontal directions. This enables the operator to make the necessary adjustments, depending on the size and type of material being processed, to ensure that improperly formed articles are ejected from belt 25 but not those articles of acceptable shape. In this embodiment, the mounting brackets are provided with lateral slots and vertical slots to permit this type of adjustment when secured to portions of the frame which support the conveyor system.

When the corn-type chips are being manufactured, it has been found that the most advantageous location for paddle wheel 16 is adjacent conveyor roller 19 at the discharge end of the conveyor mechanism 12. The wheel 16 is located slightly above the conveyor roller 19. Paddle wheel 16 can be positioned vertically such that the distal end of each blade 22 provides a clearance of about one-half inch above conveyor belt 25. The longitudinal axis of paddle wheel 16 is located approximately 2 inches rearwardly of vertical axis 38 of roller 19, and thus upstream of the exit of the oven. In this way, those chips 61 that are of acceptable form pass beneath the distal end 26 of blades 22 while those masa lumps 63 of unacceptable vertical dimension are engaged by blades 22 and driven off the conveyor belt above chips 61 which follow a downward path along a portion of the wheel before they are discharged onto take out conveyor 36.

A speed of rotation for wheel 16 is employed that is sufficient to insure that the malshaped-articles are ejected and driven well beyond the path taken by the remaining, acceptably-formed articles to avoid interference with further processing. Although a range of speeds for paddle wheel 16, and linear speeds for belt 25, can be employed for this purpose, the differential linear speed of the extremities of blades 22 with respect to the speed of the belt is substantial. In this preferred embodiment the paddle wheel angular velocity can be, for example, about 500 r.p.m. while the linear speed of the belt 17 is about 76.5 feet per minute. These speeds have been used with blades 1½ inches in radial length mounted on a hub of ¾ inch diameter.

Downstream of conveyor roller 19, there is located a catch pan 40 for receiving those masa lumps driven from conveyor belt 25 by paddle wheel 16. The catch pan 40 is mounted on supporting bracket 42 extending forwardly from a frame member downstream of the flowpath of the chips. The catch pan 40 itself includes a bottom member 44, a rear wall 46, a front wall 48, and two side walls 50. Top 52 of front wall 40 is located beneath the crown of conveyor roller 19 to provide an opening sufficiently large to ensure that the masa lumps will readily be driven into catch pan 40. The rear wall extends above the uppermost extremity of the blades of paddle wheel 16 and conveyor belt 25 to ensure that those masa lumps driven towards the catch pan will at least be engaged by the rear wall and fall ultimately to the bottom of the pan.

Bracket 42 and catch pan 40 are configured to facilitate easy replacement of the pan once filled with masa lumps. Extending laterally, generally parallel to the hub 20, adjacent bottom member 44 at each side wall 50, are two spaced apart pins 62. Each supporting bracket 42 defines an open end slot 56 for slideably receiving pins 62. Complementary pin grooves 60 registerable with pins 62 are cut into the bottom portion of slots 56 to receive and retain pins 62 once pan 40 is properly positioned within bracket 42. To place pan 40 in this position, pins 62 are aligned with open end slot 56, and pan 40 is slid toward conveyor system 12. Once pins 62 are registered with grooves 60, pins 62 will simply drop into grooves 60 by the action of gravity. The interaction of grooves 60 with pins 62 prevents movement of catch pan 40 while masa lumps are being caught therein and provides a simple and yet effective means for replacement.

In addition, this bracket configuration enables proper positioning of pan 40 relative to conveyor belt 25 to insure the ejected masa lumps will be caught. As with paddle wheel 16, catch pan 40 can be made adjustable to account for variations in other elements of the assembly such as the velocity of paddle wheel 16 and the size of masa lumps being ejected.

Although catch pan 40, as shown, has walls characterized by planar configuration, other shapes can be employed so long as the open area is sufficient to catch the ejected mass lumps. For instance, the catch pan could be cylindrical with a relatively large portion cut from the cylinder wall to enable passage of masa lumps into the pan. Where other pan configurations are employed attachment mechanisms may have to be modified accordingly to provide the replacement and locating features discussed above.

What is claimed is:

1. An apparatus for ejecting selected articles from an array of closely-spaced articles, comprising:
   (a) conveyor means for conveying a flexible web along a path, said flexible web having an outer surface for supporting said articles and an inner surface for engagement by conveyor rollers for moving said web along a continuous path;
   (b) said flexible web being configured to support said array of articles during movement along said path, said conveyor means having a discharge end for discharging articles of said array;
   (c) rotatable ejector means located above and overlying said flexible web adjacent said discharge end for allowing articles in said array of no greater than a preselected vertical dimension to pass beneath said ejector means while ejecting from said array those articles having a vertical dimension greater than said preselected vertical dimension, said rotatable ejector means comprising a plurality of substantially linear blades extending radially from the axis of rotation of said ejector means, said blades extending substantially across said flexible web and substantially parallel to said axis; and whose outer ends are moved through a path above said flexible web with at least a portion of said path including a lowermost position substantially equal to said preselected vertical dimension with respect to said flexible web during rotation of said blades;
   (d) said blades being mounted on a hub member and equally spaced peripherally about the hub and extending in a radial direction from the axis of the hub to an extent where the periphery of the blades upon rotation of the hub are positioned above the flexible web at a height slightly greater than a preselected vertical height for ejecting articles from the flexible web that extend above the preselected height, and said blades in their lowermost position being spaced away from the vertical axis of a terminal roller for the flexible web slightly upstream of the path of movement of the articles;
   (e) said blades when moving through said portion of said path being moved in the same direction as said flexible web and said axis of rotation extending substantially at right angles to the path of movement of said flexible web; and
   (f) means for rotating said ejector means at a substantial differential speed with respect to the speed of said flexible web sufficient to knock said articles of greater vertical dimension selectively from the said layer in a path above the path taken by those articles having a vertical dimension less than the preselected vertical dimension at said discharge end.

2. The apparatus according to claim 1 further comprising means for collecting articles ejected from said supporting means.

3. The apparatus according to claim 2 wherein said means for collecting includes a container for receiving and holding articles ejected.

4. The apparatus according to claim 3 wherein said container includes a front wall having a top edge located in a plane beneath that of the crown of said terminal conveyor roller to provide for collection of said ejected articles by said container, and a rear wall extending above the crown of said conveyor roller to prevent said ejected articles from being thrown past said container by said blades.

5. The apparatus according to claim 4 wherein said container includes a width dimension at least equal to the width of said conveyor supporting web and is displaced forwardly, downstream of the movement of said articles for receiving and containing articles ejected from said flexible web.

* * * * *